Patented June 25, 1940

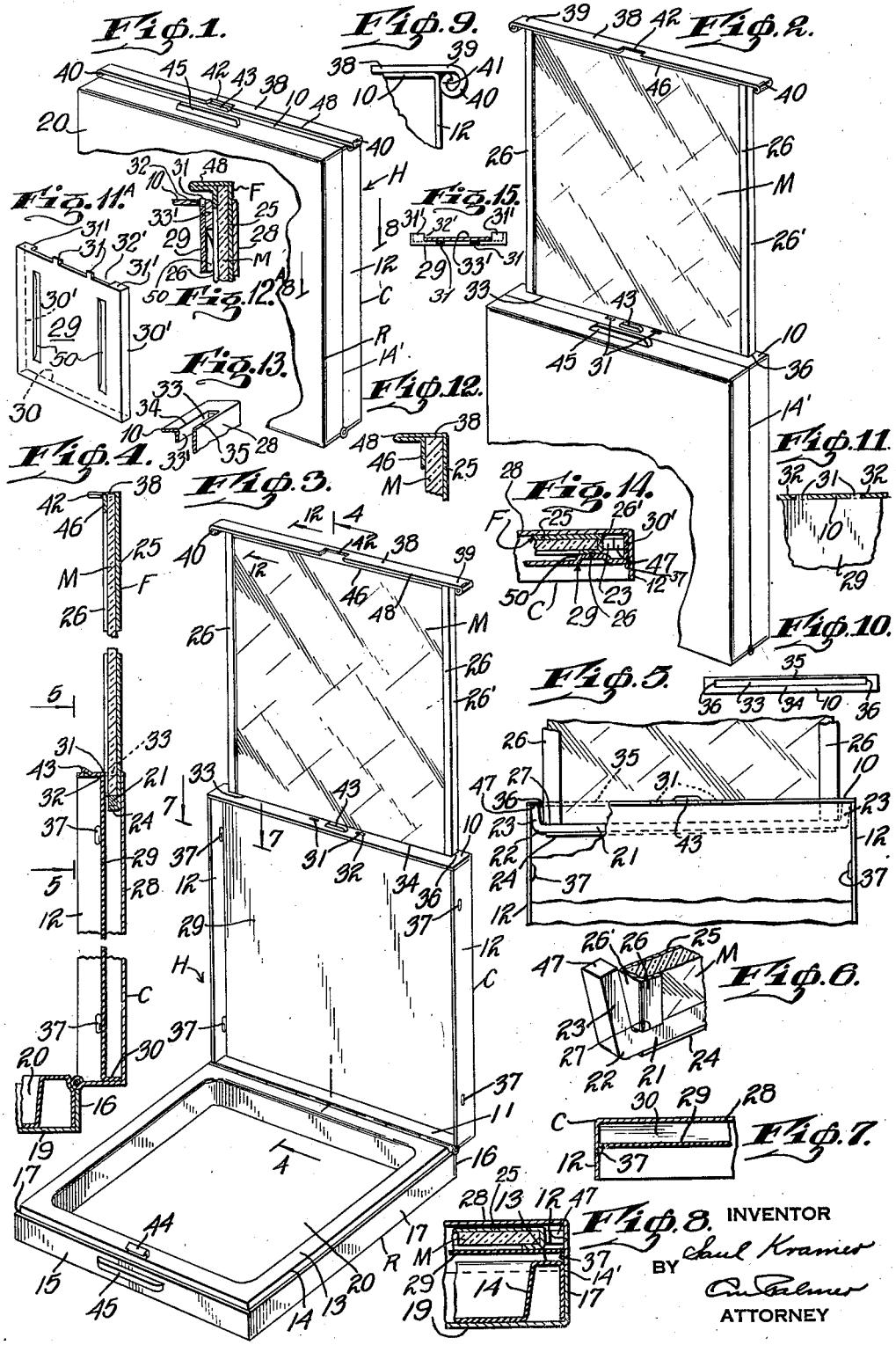

2,205,974

UNITED STATES PATENT OFFICE 2,205,974

COMPACT

Saul Kramer, Brooklyn, N. Y., assignor of one-fourth to Charles M. Palmer, Washington, D. C.

Application February 5, 1940, Serial No. 317,446

18 Claims. (Cl. 88—97)

The subject matter of this invention is a cosmetic holding device or compact of the type having a powder receiving receptacle and a powder puff retaining closure hingedly connected to the receptacle. In cosmetic holding devices of this type a mirror is usually carried by the closure or lid. In use the mirror often becomes sprayed with powder and requires cleansing after the closure is opened. By the present invention these disadvantages have been overcome in providing a novel and serviceable cosmetic holding device or compact wherein the mirror is shielded from powder sprays and is shiftable into and or out of the swingable closure; wherein the mirror may be readily withdrawn from the case in the closed relation of the closure and receptacle; wherein the mirror after use may be conveniently retracted to be within its normal concealed position within the closure even though the receptacle and closure are closed and locked; wherein a partition is employed in the closure to provide with a part of the closure a mirror compartment containing means to prevent chattering of the mirror frame transversely and widthwise of and relative to the closure; and wherein glass dust or chips often incident in the matter of securing the mirror on its slidable support or carriage is precluded from falling into the powder compartment onto the powder puff. Other functional and structural features, and important advantages will be more readily understood from the teaching of the following detailed description considered in the light of the accompanying drawing wherein:

Fig. 1 is a perspective view of the compact according to my invention showing the receptacle and closure in a closed relation and the slidable mirror in its normal concealed position within the interior of the hinged closure.

Fig. 2 is a view similar to Fig. 1 but illustrating the mirror withdrawn even though the compact is closed and locked.

Fig. 3 is another perspective view showing the compact open and the slidable mirror withdrawn from the receptacle.

Fig. 4 is a sectional view on the line 4—4 of Fig. 3.

Fig. 5 is a fragmentary and broken view of the closure or lid and taken on the line 5—5 of Fig. 4 to illustrate the interior support for the U-shaped retaining spring sustained by the mirror carriage or frame.

Fig. 6 is a fragmentary perspective and enlarged view of the bottom part of the mirror frame and the retaining brake spring carried thereby.

Fig. 7 is a sectional view on the line 7—7 of Fig. 3.

Fig. 8 is a transverse sectional view on the line 8—8 of Fig. 1.

Fig. 9 is a fragmentary view of the closure showing the coiled wings of the supplementary locking means for holding the mirror within the closure and against accidental removal thereof.

Fig. 10 is a plan view of the front wall of the closure showing the elongated guide slot for the slidable mirror carriage.

Fig. 11 is a fragmentary view of the closure illustrating the connection between the closure plate or partition and the front wall of the closure.

Fig. 12 is a sectional view on the line 12—12 of Fig. 3, and

Figs. 11A and 13 to 15 are detailed views illustrating a modified powder shielding insert or partition.

For purposes of acknowledging the prior art in so far as it relates to slidable and movable mirrors in association with compacts or cosmetic holding devices attention is respectfully called to the United States Patents to S. S. Aber 1,485,357; J. K. O'Moore-Farrell 2,094,006 and 2,103,577; and H. R. Segal 2,147,929, and 2,147,930.

In carrying out the invention, a slidable mirror generally denoted M is normally retained within the hinged closure C for the powder receptacle R of the cosmetic holding device or compact broadly designated H.

The hinge connection between the receptacle and the closure or lid C is of the conventional type and herein shown at the rear of the compact to permit the closure to swing rearwardly of receptacle in instances where it is desired to open the compact and conversely to swing towards the receptacle to close the latter.

However it should be observed that the peripheral rim of the closure defined by the front wall 10, rear wall 11, and the side walls 12 telescopically receives the upper portion 13 of the hollow mount 14 fixedly secured within the receptacle R, the upper portion 13 extending above the rim of the receptacle characterized by the front wall 15, back wall 16, and the side walls 17. The mount is also seated on the bottom wall 19 of the receptacle and defines therewith the powder compartment 20. Thus in the closed relation of the compact the mount 14 precludes the egress of powder between the parting line 14' between the receptacle and closure.

The mirror is supported in the frame carriage F and is seated on the substantially square-shaped shank 21 of the U-shaped retaining spring bar 22 having its braking side arms or resilient fingers or brushes 23 inclined and resiliently abutting sides 12 of the receptacle. The shank 21 however is seated on flange 24 projecting from the rear wall 25 of the mirror frame F. Retaining side flanges 26 integral with the side walls 26' of the metal frame are turned against the front face of the mirror to hold the latter in place or in other words the sides of the frame may be said to be channeled to retain the mirror. These flanges however are interrupted to provide gaps 27 to permit the lower arm 21 to overhang the sides of the mirror frame.

Appropriately spaced from the uninterrupted top wall 28 of the closure C is a shield in the form of a partition or backing plate 29 provided at its lower end with a spacing flange 30 disposed against the top wall 28 of the closure. The backing plate 29 also embodies at its upper end spaced lugs 31 (Fig. 11) fitting closely into the spaced locating or positioning openings 32 in the front wall 10 of the closure. In this way, the backing is held in a predetermined spaced relation from the top wall 28 and defines therewith a compartment in which the mirror frame is slidably guided to be projected when desired out of the closure and through the elongated rectangular shaped guide slot 33 or opening in the front wall 10.

Transverse play or chatter of the mirror frame is precluded by guide means comprising the top wall 28 and the plate 29 since both of the latter closely although movably confine the mirror frame or carrier and by the guide means defined by the front and rear edges 34 and 35 of the slot 33.

Displacement of the mirror frame widthwise of the closure is also prevented by the transverse or side edges 36 of the elongated slot 33 which closely straddle sides 26' of the frame although permitting the latter to be displaced in and out of the closure.

To prevent the backing plate 29 from being displaced out of its desired position when located within the closure detents or projections 37 are forced out of sides 12 and these projections retain or anchor the backing plate in place.

For facilitating convenient manipulation of the mirror into or out of the closure, the top wall 38 of the sheet metal mirror frame F comprises coiled ends or wings 39 extending laterally to overhang sides 26' and each of the wings 39 is provided with a curved lip or ear 40 having a reflexed and resilient terminal 41.

The ears 40 of the wings straddle the sides 12 of the closure and terminals 41 thereof although slightly yieldable, frictionally abut or grasp sides 12 to provide a supplementary frictional lock to prevent accidental withdrawing of the mirror from the closure. Ears 40 also serve to provide manipulatable means which may be readily grasped by the fingers of one hand of the operator whereby the mirror frame can be shifted relative to the swingable closure in instances where the latter is closed or opened.

The supplementary locking member or top wall 38 is provided with a centrally arranged notch 42 to receive the keeper or projection 43 which disengageably interhooks with the latch 44 of a slidable and spring controlled conventional lock having the depressible manipulating bar 45.

In the locked and closed relation of the receptacle and closure the mirror normally is totally concealed within the closure between the partition 29 and wall 28 and both of the latter closely confine the mirror frame and even the upper retaining flange 46 thereof, thus preventing the frame and mirror from chattering when carried about from place to place and for more positively insuring such action, the inclined arms 23 of the spring bar 22 frictionally engage or brake against the sides 12 of the closure, thus further insuring against lateral displacement of the mirror frame relative to the closure.

Where the latch 44 and keeper 43 are interlocked in the closed relation of the cover and receptacle, the mirror in such instance can be readily withdrawn by grasping the curved lips 40 of the wings and applying thereto a relatively light but outward thrust to the locking member 38 of the mirror frame. This action disengages the lips 40 from the closure and also overcomes the frictional resistance between the inclined arms 23 and the sides 12 of the closure. Thus the mirror may be withdrawn from the mirror compartment until the top faces 47 of the arms 23 strike the upper wall 10 which serves as stop means to limit the withdrawal of the mirror.

Of course the mirror frame may be set to extend out of the closure to any intermediate position thereof in which instance the frame is retained in such intermediate position by reason of the normal frictional and resilient engagement between the side walls 12 and the inclined arms 23 which have a normal tendency to deflect in an outward direction but are slightly restrained by the side walls 12, thus setting up the desired braking action.

Even though the case or compact be closed, the mirror if extended out of the case may be readily, after use be restored or retracted to its normal concealed relation behind the shield or backing 29. This is accomplished by applying a downward finger thrust on the supplementary lock 38 until the latter rests on wall 10 which serves as a stop to limit the retraction of the frame and at this time eyes 40 are in their snapped over relation to yieldingly but firmly engage the sides of the closure.

With the present invention, the mirror frame or carriage may be slidably adjusted as hereinbefore explained to be extended out of the closure even though the latter has been swung to its open position (Fig. 3) in which instant of course the mirror frame may be retracted to its fully concealed position when lip 48 of the locking bar 38 fixed to the frame strikes the top wall 10 which serves as a stop and thereafter, the case may be closed and automatically locked by the latch interhooking with the keeper.

Where the case is locked and the mirror frame is retracted, the partition 29 constitutes means to prevent powder sprays from reaching the front face of the mirror, the partition in fact serving as closure means sustained by the rim of the swingable closure and is commensurate with the interior dimensions thereof. As another function the partition serves as means to hold the usual powder puff in place and prevents powdered glass that might be present between the retaining flanges 26 and mirror from reaching the puff or the powder.

In the form according to Figs. 11A to 15 inclusive, the partition 29 may be considered as an insert having the inwardly turned rim comprising the rear flange 30, side flange 30' and the front lugs or flanges 31' the latter being interrupted by the recess 32' the sides of which (Fig. 15) closely straddle the sides of the flange or lip 33' depending from the top wall 10 of the receptacle. The flanges of the insert snugly and frictionally fit into the peripheral rim of the swingable closure to prevent seeping of powder into the mirror compartment. The rim of the insert is also spaced a predetermined distance from the top wall 28 by its flanges which rest thereagainst and the insert is further anchored against the sealing flange 33' by the lugs 31 fitting snugly into the companion notches 32, and by suitable locking projections 37. Thus it is apparent that an effective powder seal is provided between the rim of the insert and the rim of the swingable closure thus preventing powder seepage into the mirror compartment, wherein the mirror frame is closely but slidably guided against chattering between the sealing flange or lip 33', the spaced guide ribs or rails 50 projecting from the insert, and the top wall 28 of the closure. In the form shown in Fig. 3, the partition or insert 29 has its peripheral face frictionally and snugly fitting against the inner faces of the closure rim to preclude seepage of powder into the mirror compartment. In other aspects the form illustrated in Figs. 11A and 13 to 15 is along the lines shown in Figs. 1 to 11, inclusive. It follows that in each of the forms disclosed resilient U-shaped braking is provided for the purpose of holding the mirror frame in its fully concealed, fully opened or in any intermediate position and of course against chatter and means has been provided to limit the withdrawal of the mirror frame and the retraction thereof to its fully concealed position and for purposes of specification the fixed and spaced sides 12 (Fig. 3) may be said to extend transversely of the closure casing C and of course the same may be said of the spaced flanges 30' (Fig. 14) of the fixed insert 29.

Various changes may be made in details of construction and arrangement of parts without departing from the spirit of the invention or sacrificing any of the advantages thereof inherent therein.

I claim:

1. As a new article of manufacture, a closure member comprising a wall having a peripheral rim including an opening, an insert having a peripheral rim secured to said first mentioned rim and having a plate spaced from said wall to define a compartment, a slidably guided frame within and movable into and out of said compartment and comprising channeled sides, a mirror retained between said sides and bodily movable with said frame into and out of said compartment through said opening, and a bar sustained by said frame and comprising relatively resilient arms extending laterally beyond said sides and cooperating with the rim of said insert for resisting slidable displacement of said frame relative to said compartment.

2. As a new article of manufacture, a closure member comprising a wall having a peripheral rim including an opening, an insert having a peripheral rim secured to said first mentioned rim and having a plate spaced from said wall to define a compartment, a slidably guided frame within and movable into and out of said compartment and comprising channeled sides, a mirror retained by and between said sides and bodily movable with said frame into and out of said compartment through said opening, and a bar sustained by said frame and comprising relatively resilient arms extending laterally beyond said sides and frictionally cooperating with the rim of said insert for resisting slidable displacement of said frame relative to said compartment, said arms having means cooperating with the rim of said insert to limit the withdrawal of said frame from said compartment.

3. As a new article of manufacture, a closure member comprising a wall having a peripheral rim including an opening, an insert having a peripheral rim secured to said first mentioned rim and having a plate spaced from said wall to define a compartment, a slidably guided frame within and movable into and out of said compartment and comprising channeled sides, a mirror between said sides and bodily movable with said frame into and out of said compartment through said opening, a bar sustained by said frame and comprising relatively resilient arms extending laterally beyond said sides and cooperating with the rim of said insert for resisting slidable displacement of said frame relative to said compartment, and ribs carried by said plate and cooperating with said frame to prevent chattering thereof transversely of said member.

4. As a new article of manufacture, a closure member comprising a wall having a peripheral rim including an opening, an insert having a peripheral rim secured to said first mentioned rim and having a plate spaced from said wall to define a compartment, a slidably guided frame within and movable into and out of said compartment and comprising channeled sides, a mirror between said sides and bodily movable with said frame into and out of said compartment through said opening, a bar sustained by said frame and comprising relatively resilient arms extending laterally beyond said sides and cooperating with the rim of said insert for resisting slidable displacement of said frame relative to said compartment, and means extending laterally of and secured to said frame outside of said member and having manipulatable terminal ears for straddling said member.

5. As a new article of manufacture, a hollow casing comprising a wall including an opening, a fixed insert carried by said casing and defining therewith a compartment, spaced fixed means caried by said casing and extending transversely thereof, a frame slidably guided within and movable into and out of said compartment and comprising spaced channeled sides, a mirror retained by said sides and bodily movable with said frame into and out of said compartment through said opening, and a bar carried by said frame and comprising relatively resilient arms extending laterally beyond said sides and frictionally cooperating with said spaced fixed means to prevent accidental displacement of said frame relative to said casing.

6. As a new article of manufacture, a hollow casing comprising a wall including an opening, an insert attached to said casing and defining therewith a compartment, a frame slidably guided within and movable into and out of said compartment and comprising channeled elements along the spaced sides thereof, spaced means fixedly carried by said casing and extending transversely thereof, a mirror having marginal portions retained by said elements and movable into and out of said compartment through said opening upon displacement of said frame relative to said casing and through said opening, and a bar carried by said frame and comprising relatively resilient arms extending laterally beyond said elements and frictionally cooperating with said spaced fixed means for resisting accidental slidable displacement of said frame relative to said casing.

7. As a new article of manufacture, a casing comprising a wall including an opening, a plate attached to said casing and defining therewith a compartment, spaced means carried by and disposed transversely of said casing, a frame slidably guided within and movable into and out of said compartment and comprising channeled sides, a mirror retained between said sides and bodily movable with said frame into and out of said compartment through said opening, a flange integral with said frame, and a bar seated on said flange and comprising relatively resilient arms extending laterally beyond said sides for yieldingly but frictionally cooperating with said spaced means.

8. As a new article of manufacture, a casing comprising a wall including an opening, a plate attached to said casing and defining therewith a compartment, a frame slidably guided within and movable into and out of said compartment and comprising spaced sides, spaced means carried by said casing and extending transversely thereof, a mirror retained between said sides and bodily movable with said frame into and out of said compartment through said opening, and a bar having a shank carried by said frame and comprising upstanding relatively resilient arms extending laterally beyond said sides and yieldingly cooperating with said spaced means to adjustably sustain said frame relative to said casing.

9. As a new article of manufacture, a casing comprising a wall including an opening, a plate attached to said casing and defining therewith a compartment, a frame slidably guided within and movable into and out of said compartment and comprising spaced channeled sides, a mirror retained between said sides and bodily movable with said frame into and out of said compartment through said opening, spaced means carried by said casing and disposed transversely thereof, and a bar having a shank carried by said frame and comprising relatively resilient arms extending laterally beyond said sides to straddle the latter and yieldingly cooperating with said spaced means to sustain said frame adjustably relative to said casing, said bar including stop means cooperating with said wall to limit the withdrawal of said mirror and frame out of said opening.

10. As a new article of manufacture, a casing comprising a wall including an opening, a plate attached to said casing and defining therewith a compartment, spaced means fixedly carried by said casing and arranged transversely thereof, a slidably guided frame movable into and out of said compartment through said opening and comprising channeled sides, a mirror retained between said sides and bodily movable with said frame into and out of said compartment through said opening, a bar movable longitudinally of said casing and carried by said frame and comprising relatively resilient arms extending laterally beyond said sides and frictionally but yieldingly engaging said spaced means to resist accidental projection of said frame out of said compartment, and stop means outside of said casing and carried by said frame and cooperating with said wall to limit the retraction of said frame into said compartment.

11. As a new article of manufacture, a casing comprising a wall having an opening, a slidably guided frame movable into and out of said casing through said opening and comprising channeled sides, a mirror retained between said sides and bodily movable with said frame into and out of said casing through said opening, spaced means carried by said casing and extending transversely thereof, a bar carried by said frame and comprising relatively resilient arms extending laterally beyond said sides for frictionally engaging said spaced means, and a stop outside of said casing and carried by said frame and cooperating with said casing to limit the retraction of said frame into said casing.

12. As a new article of manufacture, a casing comprising a wall including an opening, a plate attached to said casing and defining therewith a compartment, a slidably guided frame movable into and out of said compartment through said opening and comprising sides, a mirror retained between said sides and bodily movable with said frame into and out of said compartment through said opening, a bar carried by said frame and comprising relatively resilient arms extending laterally beyond said sides, spaced means carried by said casing and disposed transversely thereof and cooperating with said arms for resisting slidable projection of said frame out of said compartment, a stop outside of said casing and carried by said frame and cooperating with said casing to limit retraction of said frame into said compartment, and manipulating means sustained by said stop to facilitate withdrawing of said frame from said compartment.

13. As a new article of manufacture, a casing comprising a wall including an opening, an insert within and attached to said casing and defining therewith a compartment, a slidably guided frame movable into and out of said compartment through said opening and comprising channeled sides, a mirror retained between said sides and bodily movable with said frame into and out of said compartment through said opening, spaced means carried by and extending transversely of said casing, a bar carried by said frame and comprising relatively resilient arms extending laterally beyond said sides and cooperating with said spaced means for resisting slidable projection of said frame out of said compartment, and resilient manipulatable means outside of said casing and carried by said frame and cooperating to yieldingly straddle said casing to prevent accidental withdrawal of said frame from said compartment.

14. As a new article of manufacture, a casing comprising a wall having an opening, an insert attached to said casing and defining therewith a compartment, a slidably guided frame within and movable into and out of said compartment, a mirror retained by said frame and bodily movable with the latter into and out of said compartment through said opening, a flange integral with said frame, spaced means carried by and extending transversely of said casing, a bar seated on said flange and comprising spaced arms extending laterally beyond said frame and yieldingly but frictionally engaging said spaced means, and a stop secured to said frame and cooperating with said wall for limiting retraction of said mirror into said compartment and including resilient means for straddling and yieldably embracing said casing.

15. As a new article of manufacture, a casing comprising a wall having an opening, an insert attached to said casing and defining therewith a compartment, a slidably guided frame within and movable into and out of said compartment and comprising spaced sides, a mirror retained between said sides and bodily movable with said frame into and out of said compartment through said opening, spaced means carried by and extending transversely of said casing, a bar sustained by said frame and comprising relatively resilient arms straddling said frame and yieldingly and frictionally engaging said spaced means, and spaced lips extending laterally of said frame for removably straddling said casing.

16. As a new article of manufacture, a casing comprising a wall having an opening, an insert attached to said casing and defining therewith a compartment, a frame slidably guided within and movable into and out of said compartment and comprising interrupted channeled sides defining alined gaps, a mirror retained between said sides and bodily movable with said frame into and out of said compartment through said opening, a flange integral with said frame, spaced means carried by said casing and disposed transversely thereof, and a bar seated on said flange and projecting through said gaps and comprising relatively resilient arms extending laterally beyond said sides and cooperating with said spaced means for resisting slidable displacement of said frame relative to said casing.

17. As a new article of manufacture, a hollow closure member comprising a wall having a peripheral rim including an opening and a flange extending from said rim within said member adjacent said opening and spaced from said wall, an insert having a peripheral rim secured to said first mentioned rim and including a plate overlapping and positioned against said flange and spaced from said wall to define a compartment therewith, a slidably guided frame within and movable into and out of said compartment and comprising channeled sides, a mirror between said sides and bodily movable with said frame into and out of said compartment through said opening, and a bar sustained by said frame and comprising relatively resilient arms extending laterally beyond said sides and cooperating with the rim of said insert for resisting slidable displacement of said frame relative to said compartment.

18. As a new article of manufacture, a hollow closure member comprising a wall having a peripheral rim including an opening and a flange extending from said rim within said member adjacent said opening and spaced from said wall, an insert having a peripheral rim secured to said first mentioned rim and including a plate overlapping and positioned against said flange and spaced from said wall to define a compartment therewith, a slidably guided frame within and movable into and out of said compartment, a mirror retained by said frame and bodily movable therewith into and out of said compartment through said opening, and a bar sustained by said frame and comprising relatively resilient arms extending laterally beyond said frame and cooperating with the rim of said insert for resisting slidable displacement of said frame relative to said compartment.

SAUL KRAMER.